United States Patent
Merrell et al.

(10) Patent No.: US 6,220,442 B1
(45) Date of Patent: Apr. 24, 2001

(54) ARTICLE OF MANUFACTURE AND METHOD FOR PROTECTING INFORMATION-STORAGE DEVICES

(75) Inventors: Troy James Merrell, Longmont; John Fredrick Hazekamp, Erie; Todd Allen Redder, Longmont, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/341,699

(22) PCT Filed: Jul. 27, 1999

(86) PCT No.: PCT/US99/14170

§ 371 Date: Jul. 27, 1999

§ 102(e) Date: Jul. 27, 1999

Related U.S. Application Data (60) Provisional application No. 60/139,914, filed on Jun. 17, 1999.

(51) Int. Cl.⁷ .................................................. B65D 85/30
(52) U.S. Cl. .......................... 206/721; 206/521; 206/592; 220/4.23
(58) Field of Search ................................. 206/307, 521, 206/592, 588, 456, 719, 721; 220/4.23, 4.22, 4.21, 4.24, 671, 675, 837, 838, 839

(56) References Cited

U.S. PATENT DOCUMENTS

| | | | | |
|---|---|---|---|---|
| 4,974,738 | * | 12/1990 | Kidd et al. | 220/4.24 |
| 5,046,659 | * | 9/1991 | Warburton | 220/4.22 |
| 5,090,568 | * | 2/1992 | Tse | 206/456 |
| 5,096,084 | * | 3/1992 | Wells | 220/4.22 |
| 5,147,042 | * | 9/1992 | Levy | 206/456 |
| 5,515,993 | * | 5/1996 | McManus | 220/4.23 |

* cited by examiner

*Primary Examiner*—David T. Fidei
(74) *Attorney, Agent, or Firm*—Edward P. Heller, III (57) ABSTRACT

A means is provided for packaging disc drives and other information-storage devices in a manner that reduces transmittal of shock to the packaged device. The device is placed in a static-dissipative package comprising an upper and lower portion, each of which is externally ribbed to absorb shock. Further anti-impact protection is provided by internal buttresses that cushion the packaged device. The package is preferably a unitary article molded from PVC plastic sheeting, with the upper and lower portions joined at an accordion-like hinge. The upper and lower portions nest together at the peripheral edges, providing a labyrinthine path (in effect, a seal) that prevents passage of contaminants. Shock transmittal (relative to a bare drive) is reduced by a factor of approximately 5–7.

18 Claims, 6 Drawing Sheets

ARTICLE OF MANUFACTURE AND METHOD FOR PROTECTING INFORMATION-STORAGE DEVICES

The benefit of the filing date of Provisional Application 60/139914 (filed Jun. 17, 1999) is claimed.

BACKGROUND

The field of this invention is protective packaging for disc drives and other information-storage devices. More specifically, the invention concerns a method and device for protecting disc drives and other information-storage devices from damage resulting from impact and electrostatic discharge during shipment and other non-operating activities.

The principal cause of failure of disc drives is handling damage, not operational failure (so-called disc crashes). Handling damage to a disc drive occurs as a result of bumping or dropping the disc drive or causing it to come in contact with a hard surface. Such handling damage is classified as disc slip, head slaps, or gross cosmetic damage. Handling damage occurs during freight transit, carton handling, actual product handling, and product-system integration.

Generally similar damage occurs in the case of other information-storage devices, such as tape drives and optical drives. Additional non-operational damage to disc drives and similar devices occurs as a result of electrostatic discharge, and it is typical to ship devices in an anti-static (static-shielded) bag (also known as an ESD bag) to prevent or reduce such damage.

Current non-operational shock specifications for Seagate desktop information storage devices call for ability to survive 300 g at 2 ms. For high-end products, the specification is approximately 150 g at 2 ms. At shock levels in excess of the specification, it is considered that a drive will suffer physical damage. Handling actions such as those described above (e.g., freight transit) often impart shock in excess of the g levels specified above, leading to return of damaged products for repair or replacement under product warranties, at manufacturer expense. It is believed that this problem and the expense due to handling damage has existed for many years in the disc drive industry.

OBJECTS AND SUMMARY OF THE INVENTION

It is an object of the invention to reduce handling damage and the expense resulting therefrom by improving anti-shock protection for disc drives and other information-storage products.

It is an object of the invention to permit a package containing a disc drive or other information-storage device to be subjected to higher than 300 g at 2 ms shock levels while the disc drive or other information-storage device within the package receives less than 200 g at 2 ms shock levels.

It is a further object of the invention to provide anti-static protection that will eliminate need for use of an anti-static (static-shielded) bag for the disc drive or other information-storage device within the package.

The invention provides a means for packaging disc drives and other information-storage devices in a manner that reduces transmittal of shock to the packaged device. The device is placed in a static-dissipative package comprising an upper and lower portion, each of which is externally ribbed to absorb shock. Further anti-impact protection is provided by buttresses that cushion the packaged device. The package is preferably a unitary article molded from PVC plastic sheeting, with the upper and lower portions joined at an accordion-like hinge. The upper and lower portions nest together at the peripheral edges, providing a labyrinthine path (in effect, a seal) that prevents passage of contaminants. Shock transmittal (relative to a bare drive) is reduced by a factor of approximately 5–7.

DETAILED DESCRIPTION OF THE INVENTION

Figure 1:
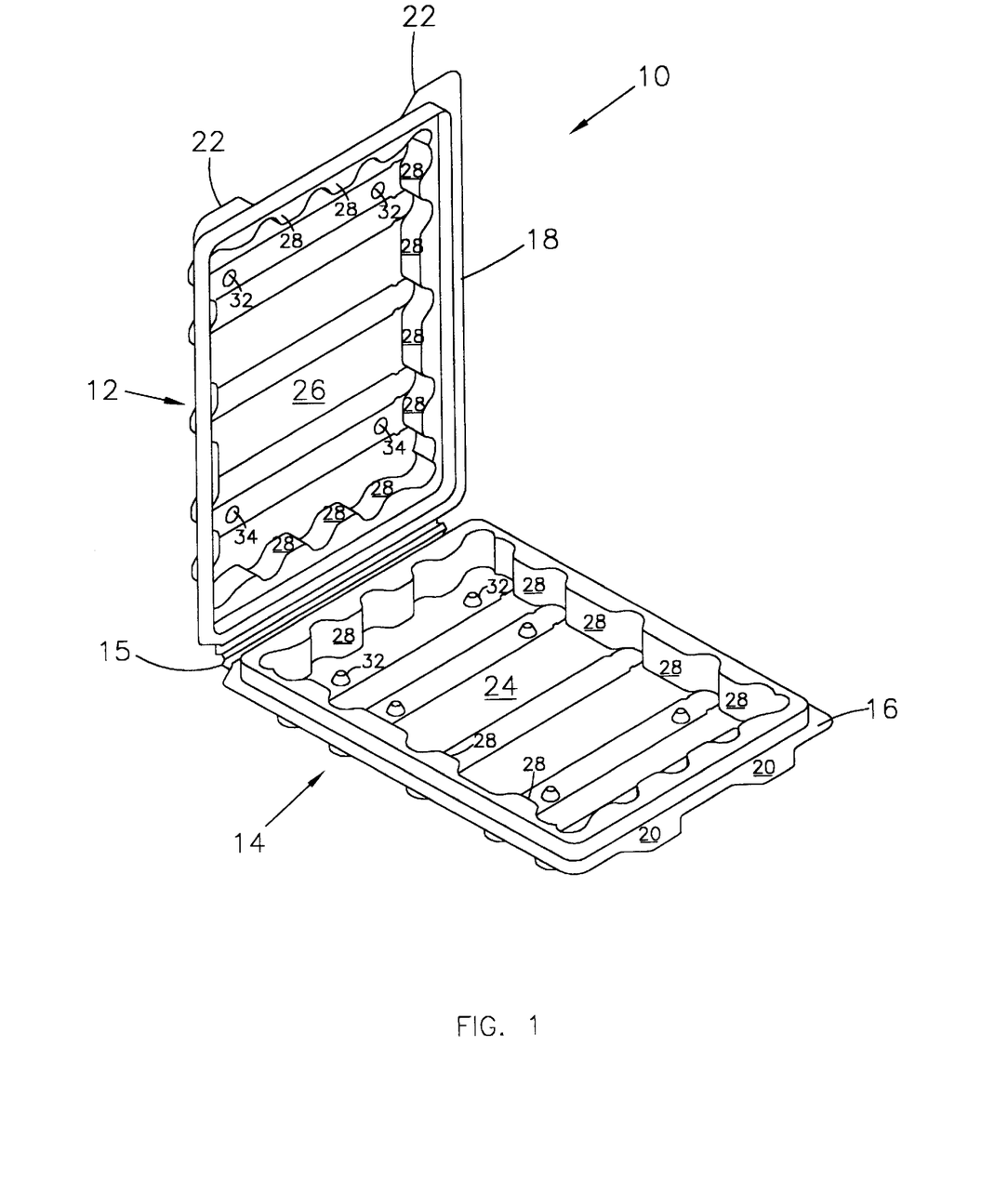
FIG. 1 is a perspective drawing of an opened package of the invention, from a vantage point above the left proximal end of the lower portion of the package.

The invention can be appreciated by considering the design of Seagate's commercial Seashell™ package for a disc drive. Referring to FIG. 1, a perspective drawing of the opened package of the invention from a vantage point above the left proximal end of the lower portion of the package, it is seen that clamshell package 10 comprises an upper molded-sheet portion 12 and a lower molded-sheet portion 14. Upper and lower molded-sheet portions 12 and 14 are joined at their distal ends by an accordion hinge 15. Hinge 15 is shown more advantageously in FIGS. 9–10, in cross-section, and is discussed in greater detail below.

Upper and lower molded-sheet portions 12 and 14 are generally congruent to one another, in the sense that their dimensions are approximately the same and they fit together in approximate mirror image form. However, as will appear, structural differences between upper and lower molded-sheet portions 12 and 14 (in particular, how they interlock)

make them not true mirror images of one another and not fully congruent.

In the commercial Seashell™ embodiment of the invention, the package is a unitary, one-piece article, which is integrally formed by vacuum molding a plastic sheet. This is considered preferably from a manufacturing cost standpoint. However, the package may be manufactured as a two-piece article also, with or without a hinge. For example, if the package is manufactured as a two-piece article without a hinge, upper and lower molded-sheet portions 12 and 14 may be taped together. However, this is considered a non-preferred embodiment, since it calls for using two molds and increases parts count as well as requiring a tape application step.

Clamshell package 10 of this embodiment of the invention was manufactured by vacuum molding approximately 0.020 to 0.024 inch thick polyvinyl chloride (PVC) sheet material. (Different exemplars were produced at various such thicknesses. The 0.20 thickness is considered to be preferred). The material used was Penta-stat™ PVC manufactured by Klockner. This material is static-dissipative, which permits avoiding the cost of an ESD bag that would otherwise be needed. The vacuum molding process was entirely conventional and involved use of techniques well known to persons of skill in the art. Other plastic materials besides PVC were tried, but packages made from PVC provided the best shock resistance of the materials tested.

Figure 2:
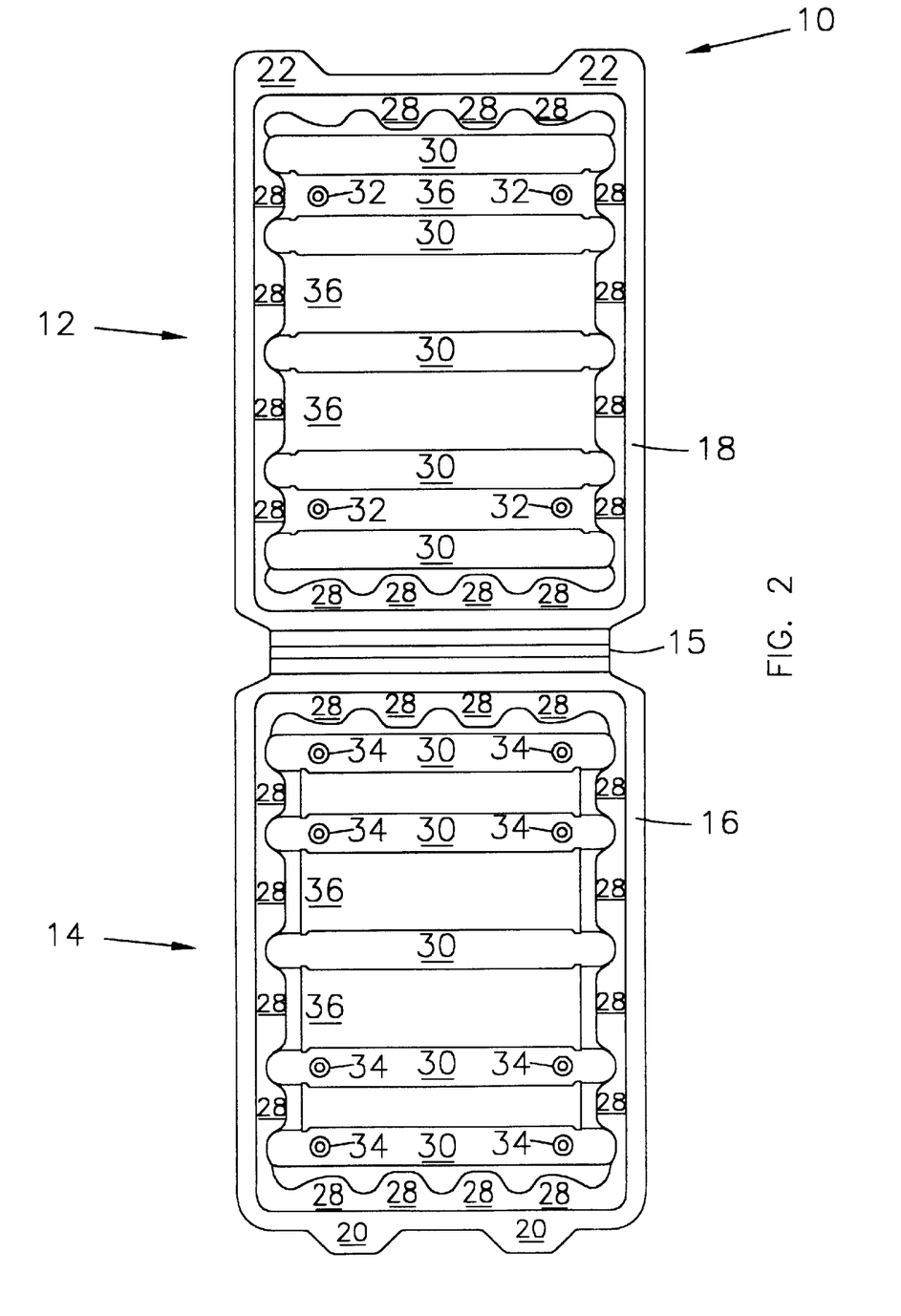
FIG. 2 is a plan view looking down at an opened package of the invention, with the lower proximal end of the package lowermost and the upper proximal end uppermost.

Referring now to FIG. 2, a plan view showing the inside of the package as the package appears when it leaves the vacuum mold, it is seen that a lower molded-sheet portion flange member 16 extends generally laterally all around lower molded-sheet portion 14 of package 10. Similarly, an upper molded-sheet portion flange member 18 extends generally laterally all around upper molded-sheet portion 12 of package 10. Each flange member has a stepped structure, shown advantageously in FIGS. 9–10, so that flange member 16 has an inner lateral portion 16a, an intermediate vertical portion 16b, and an outer lateral portion 16c, while flange member 18 has an inner lateral portion 18a, an intermediate vertical portion 18b, and an outer lateral portion 18c. Lower molded-sheet portion flange 16 has two tabs 20 extending proximally therefrom. Upper molded-sheet portion flange 18 has two tabs 22 extending proximally therefrom. When package 10 is closed, tabs 20 engage against tabs 22 with an overlap, as shown advantageously in FIG. 3, a plan view of the closed package. Tabs 20 and 22 cooperate to facilitate opening the package when it is closed; the user simultaneously pushes tab(s) 20 down and 22 up to separate the upper and lower molded-sheet portions of the package at the proximal end.

In the first commercial Seashell™ embodiment of the invention, the package is approximately 5.25 inches wide, 7.6 inches long (including tabs), and 1.5 inches high (including ribs). The outer lateral flange members extend laterally outward approximately 0.25 inches, and the tabs extend another approximately 0.25 inches longitudinally outward. This package accommodates a disc drive (or other information-storage device) approximately 4 inches wide, 5.75 inches long, and 1.25 inches high.

Figure 10:
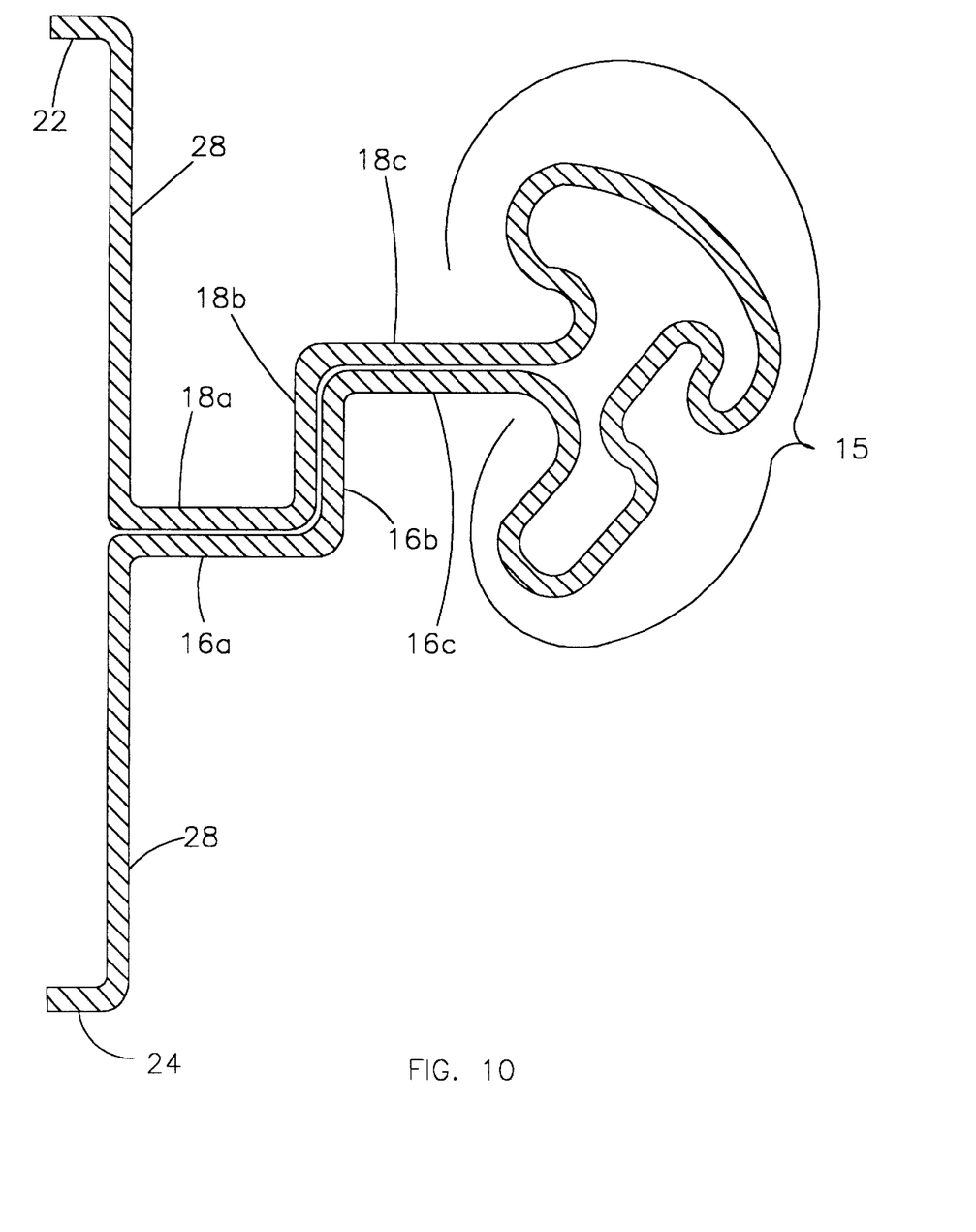
FIG. 10 is also a side view cross-sectional detail of the hinge located at the distal end of the package, showing adjacent portions of the package. In this view the upper portion of the package has been rotated to the left (counterclockwise), relative to FIG. 9, showing the package closed and the flange member of the upper portion of the package nested into the flange member of the lower portion of the package.

Returning to FIG. 1, it is seen that lower molded-sheet portion flange member 16 leads via the above-described stepped structure to lower dome 24, which is a half disc drive height recess in the package. Upper molded-sheet portion flange member 18 leads to a complementary stepped structure for upper dome 26, which is also a half disc drive height recess in the package. Accordingly, a labyrinthine path, shown more advantageously in FIG. 10, is provided to block ingress of contaminants from outside the package to the disc drive to be stored within domes 24 and 26 (and it also blocks escape of fluids, if any, from the drive stored in the domes). At the same time, a structure is provided by which the upper dome fits with the lower dome tightly and keeps the package closed with a so-called male-to-female fit of the flange members.

Figure 9:
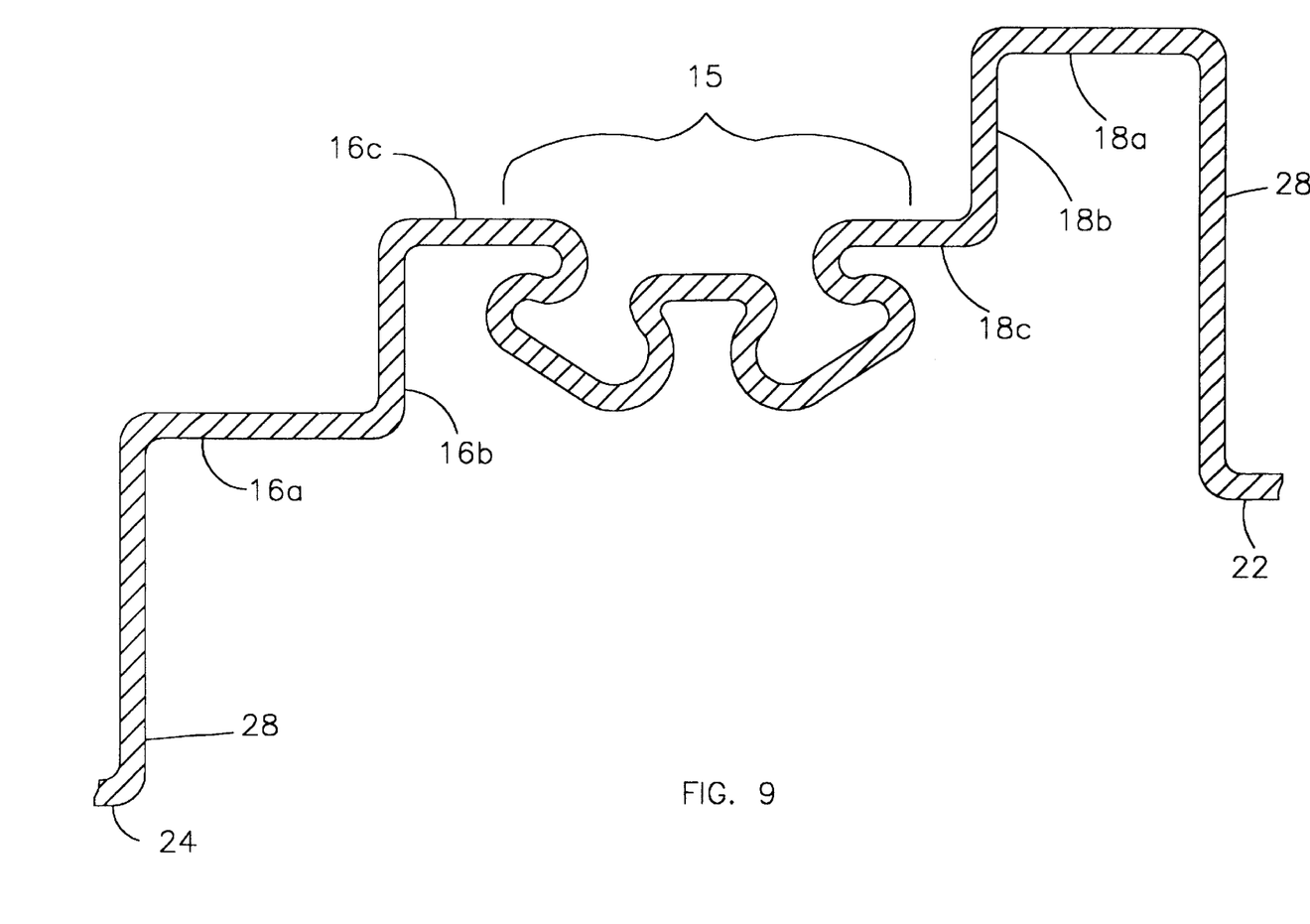
FIG. 9 is a side view cross-sectional detail of the hinge located at the distal end of the package, showing adjacent portions of the package, with the upper portion of the package to the right and the lower portion to the left. The package if fully open in this view, with the upper and lower portions 180 degrees apart.

The flange member structure "leans" slightly inward at the upper part of the steps, so that when the upper and lower molded-sheet portion are pressed together a deformation and detent effect occurs, holding the closed package together. The operation of this structure is further described below in connection with hinge 15, and FIGS. 9–10 show hinge 15 and the flange members in cross-section. As shown in FIG. 10, when package 10 is closed the upper extremities of intermediate vertical portions 16b and 18b are slightly to the left of the lower extremities thereof, causing a tight fit and a detent effect tending to maintain closure. A similar cross-section for the flange members obtains all around the rest of the periphery of the package, although without any hinge 15 as shown in FIG. 10. Thus, for material (e.g., dirt) to enter or exit the closed package the material would need to traverse the labyrinthine path defined by elements 16c/18c, 16b/18b, and 16a/18a of flange members 16 and 18.

While the labyrinthine path shown here is, in effect, merely a partly straightened-out Z, other non-straight-line and/or more complex paths may be used to exclude contaminants, such as a Z (not straightened out), W, M, or Q, so long as the path is effective to exclude undesirable material and yet permissive of closure and opening of the package.

Domes 24 and 26 are generally (but not fully) both congruent and mirror images. Both domes have approximately the same dimensions and they fit together in complementary fashion along the flange members, so as to define a compartment in which to place the disc drive or other storage device being packaged. Both domes are characterized by longitudinal and transverse vertical dome walls with an undulating, sine-wave-like cross-section. These structures are referred to hereinafter as buttresses 28. Both domes also have generally similar, riblike structures 30 extending vertically outward therefrom.

Figure 3:
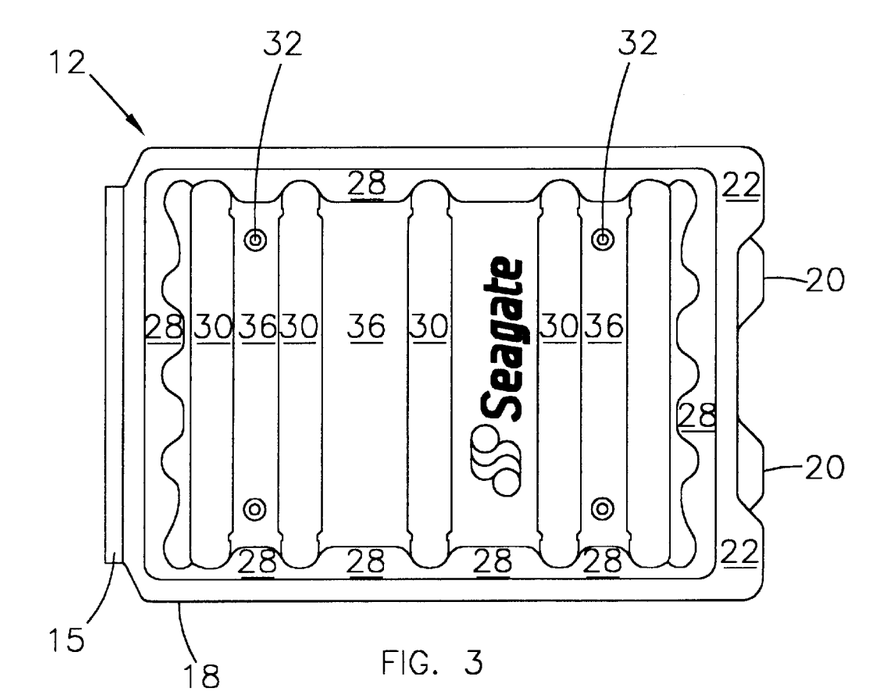
FIG. 3 is a plan view looking down at the upper portion of the closed package with the proximal end of the package to the right.
Figure 4:
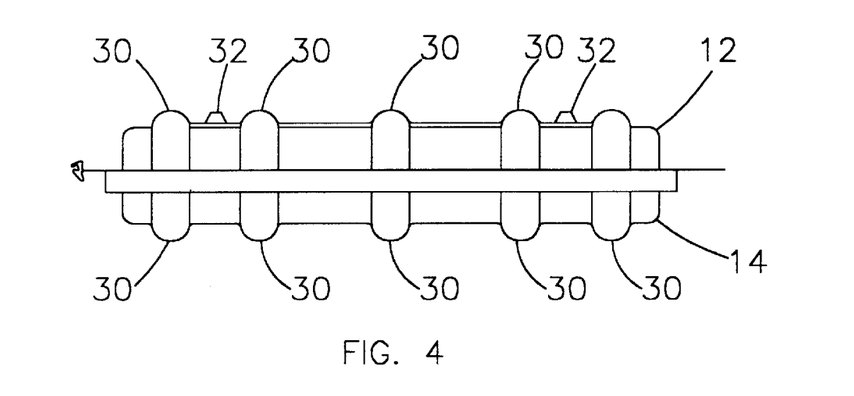
FIG. 4 is a side view of the closed package with the proximal end to the right.
Figure 5:
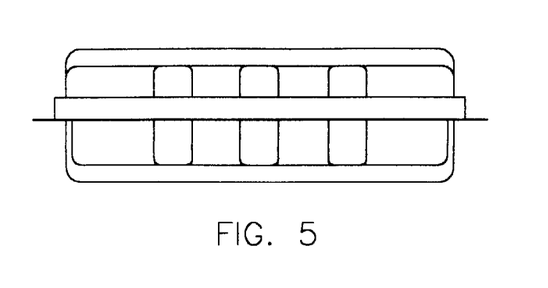
FIG. 5 is an end view of the distal end of the closed package.
Figure 6:
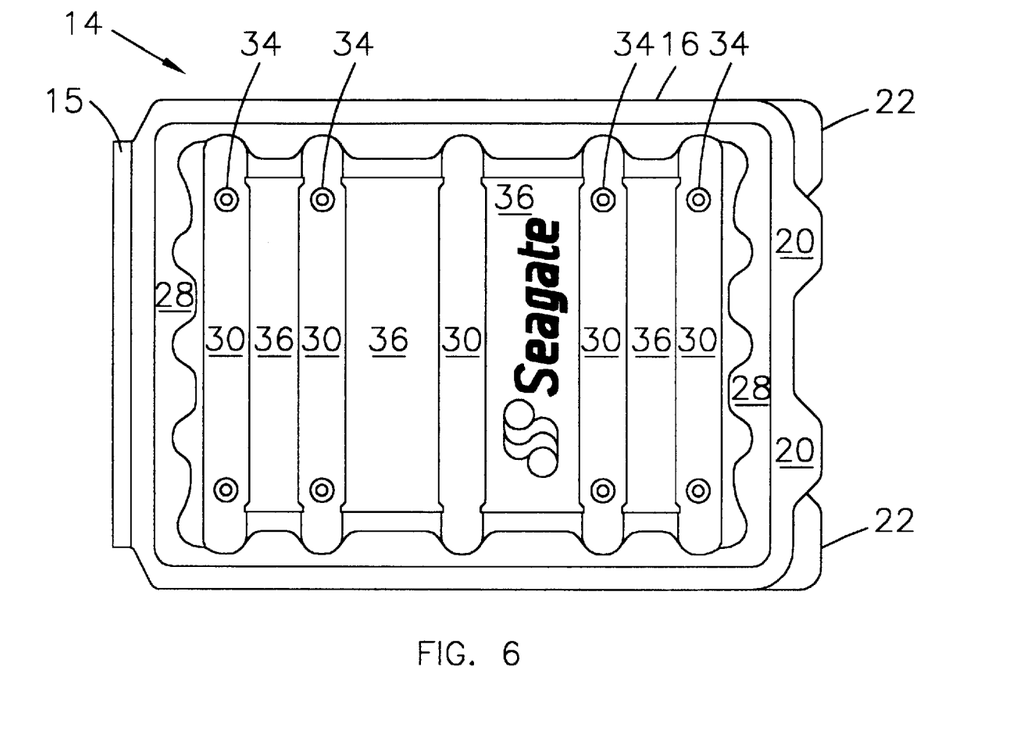
FIG. 6 is a plan view looking down at the lower portion of the closed package with the proximal end of the package to the right.
Figure 7:
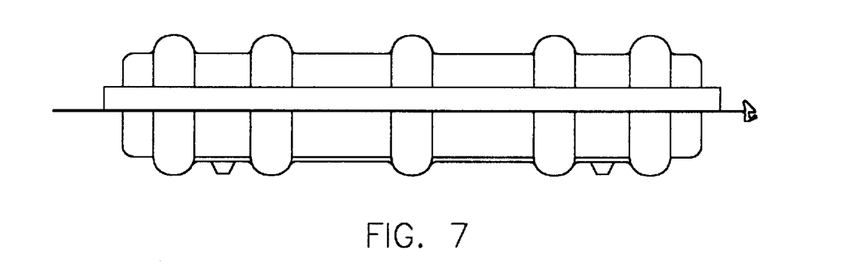
FIG. 7 is a side view of the closed package with the proximal end to the left.
Figure 8:
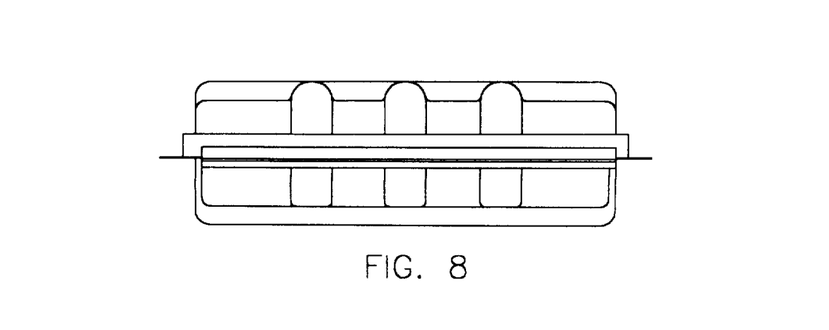
FIG. 8 is an end view of the proximal end of the closed-package.

Turning first to the ribs, by referring to FIG. 4 it is seen that a plurality of rounded ribs 30 extend out from upper and lower molded-sheet portions 12 and 14 of the package, and more specifically from domes 24 and 26. Rounded ribs 30 are resilient and deform inward upon impact. Therefore they absorb shock, thereby protecting the disc drive stored within the package. In the commercial embodiment of the Seashell™ package, it was found that five upper ribs and five lower ribs, transversely disposed on domes 24 and 26 as shown in FIGS. 3–4 (and described in the succeeding paragraph), performed satisfactorily to meet desired shock resistance specifications. It appears that the optimum arrangement of ribs must be determined empirically on a case-by-case, trial-and-error basis. It has not been possible thus far to develop a rationale for determining best rib arrangement, and therefore no substitute has yet been found for a primarily empirical approach. It does appear, however, that more than one satisfactory arrangement can be devised that will perform within shock specifications, so that to some extent it is a matter of design choice or aesthetics what specific arrangement to use.

As indicated, disposed on the transverse and longitudinal vertical dome walls around the periphery of upper and lower domes 24 and 26 are a series of rounded, buttress-like structures 28, which are adapted to cushion the disc drive within the domes. These rounded buttress-like structures are resilient and thus act as springs to absorb shock and cushion the disc drive to prevent it from rattling around in the package when the package is subjected to impact from the ends or sides of the package. Preferably, buttresses 28 press against the disc drive and hold if firmly in place at all times. Each dome's buttresses preferably extend vertically half the height of the disc drive.

The inwardly extending lateral extremities of the buttresses define a compartment within the domes, whose width and height dimensions correspond to the width and height of the disc drive to be stored in the package. The number of buttresses extending inward should be at least two per side, since two points (here, points of tangency) define a line in a Euclidean plane. Other than that, the number and location of the buttresses is a matter of design choice and of aesthetic considerations.

Also, preferably, the buttresses are structured in a generally sine-wave-like shape, so that their portions not projecting convexly and inward into the domes project outward and convexly away from the domes. Thus, the buttress formations at the proximal and distal ends of the domes both project inward to cushion the disc drive within the domes at one part of the "sine wave" and they project somewhat into the flanges' inner lateral portion a half cycle farther along the "sine wave". Hence, when the package lands on an end at an angle the buttresses' outwardly projecting parts provide some cushioning. In the case of the transverse extremes of the domes (i.e., the right and left sides), the buttress formation interacts with ribs 30. The inwardly projecting parts of the buttresses are located between the ribs. The outwardly projecting parts of the buttresses preferably coincide in shape and location with the ribs and thus they vertically extend the rounded projections of the ribs inward from the dome roof to the flange members. Hence, when the package lands on a side at an angle the outwardly projecting parts of the buttresses provide some cushioning, in the same manner as the ribs do.

In addition, tabs 20 and 22, as well as hinge 15, are resilient and thus capable of further absorbing impact directed at the ends of the package.

It is desirable that the ribs extend all of the way across the domes, to provide maximum protection against impact. However, they should not extend transversely so far that they interfere with the effect of the labyrinthine path of the flange members. If they did so, then the outwardly projecting buttress vertical extension of the ribs could open up a path around the seal that the flange members provide against passage of contaminants. It is considered that approximately 0.1 inch clearance between the end of the ribs/buttresses and the vertical portion of the flange (i.e., element 16b and 18b) is appropriate for this purpose. Such a clearance can be observed advantageously in FIG. 1, where it is seen that the vertical buttress walls do not extend all of the way to the intermediate vertical portions of the flanges (elements 16b and 18b).

In the first commercial Seashell™ embodiment, the ribs are semicircular in cross-section, approximately 0.5 inches in diameter, and project outward from the dome approximately 0.25 inches. There are five ribs transversely disposed on each of the roof domes, extending transversely the entire width of the roof and to approximately 0.1 inches of the intermediate vertical flange portions. The longitudinally proximal edge of the first (i.e. most proximal) rib approximately coincides with the proximal end of the compartment defined by the proximal inwardly projecting buttresses. Likewise, the longitudinally distal edge of the fifth (i.e., most distal) rib approximately coincides with the distal end of the space or compartment defined by the distal inwardly projecting buttresses. The third (central) rib is approximately longitudinally equidistant from the proximal and distal ends of the same compartment. The remaining (second and fourth) ribs are symmetrically disposed slightly more toward the ends of the roof than toward its center, so that the respective distances between the central longitudinal (transversely extending) axes of the first, second, and third ribs are approximately 1 inch and 1.5 inches. The five buttresses extending laterally outward from each side of each dome, and coinciding with the ribs, each define four buttresses extending laterally inward. Each end of a dome has five buttresses extending outward and four buttresses therebetween extending inward.

The ribs or the flat areas between ribs optionally contain small conelike projections or complementary recesses, to facilitate stacking the packages. Flat areas between ribs may advantageously be used to contain logos, brand names, etc.

In another, less preferred embodiment, the dimensions of the package were similar, except that the five ribs transversely disposed on each of the roof domes, extending transversely the entire width of the roof and to approximately 0.1 inches of the intermediate vertical flange portions, were spaced such that the two ribs flanking the centermost rib had their longitudinal axes separated approximately 1 inch from the longitudinal axis of the centermost rib, and such axes were separated from the axes of the most distal and most proximal ribs, respectively, by approximately 1.5 inches. In still another, less preferred embodiment, the dimensions of the package were similar, except that the five ribs transversely disposed on each of the roof domes were spaced approximately equidistant from one another (each longitudinal axis approximately 1.25 inches apart from the next longitudinal axis).

Referring to FIGS. 9–10, which show cross-sectional views of the hinging along a longitudinal vertical section of the package, it is seen that hinge 15 is an accordion-like or pleated structure. As shown in FIG. 9, hinge 15 is located between the distal ends of the package portions, connecting the distal ends of flanges 16 and 18. As shown in this embodiment, hinge 15 in cross-section resembles the alphanumeric characters 2 S 2 S connected together at their respective lower, upper, and lower adjacent terminal extremities. Other possible hinge structures may be devised with cross-sections resembling W's, M's, Z's, etc. The purpose of this pleated or folded structure, however embodied, is to flexibly vary the longitudinal dimension of the hinge in order to permit the flange member of the upper molded-sheet portion to be lifted up directly above, and clearing, the flange member of the lower molded-sheet portion when the hinge is rotated in order to nest the flange members, and at the same time to permit a state of equilibrium to obtain when the package is fully open or fully closed, as further described below.

In the fully closed position of clamshell package 10, upper and lower molded-sheet potions 12 and 14 are in registration with one another; the domes and buttresses of each portion are vertically aligned; and the step structure of the upper flange member is nested into the step structure of the lower flange member. Thus, element 18c is directly over and in registration with element 16c. Element 18b vertically parallels and engages element 16b and is surrounded thereby. Element 18a is directly over and in registration with element 16a. Hinge 15 is folded up in a manner permitting this configuration of the upper and lower molded-sheet potions.

In the fully open position of clamshell package 10, with the upper and lower molded-sheet potions extending in 180 degree opposite directions, element 18c, the outer lateral portion of flange member 18 of upper molded-sheet portion 12, is at approximately the same height as element 16c, the outer lateral portion of flange member 16 of lower molded-sheet portion 14. At the same time, element 18a, the inner lateral portion of flange member 18 of upper molded-sheet portion 12, is raised substantially above the elements of lower molded-sheet portion 14. Hinge 15 is opened up to a maximum extent.

Each of these positions represents a static equilibrium, so that the resilient, deformable elements of the package are in "energy wells" in each configuration. During the transition from one configuration to the other, mechanical energy is applied to the system, the hinge stretches and stores energy, and it subsequently retracts into a lower-energy configuration and releases energy as low-grade heat upon and after package closure (and also after being opened from a fully closed position, when the reverse cycle occurs). When the package is fully closed and the flange member of the upper molded-sheet nests into the flange member of the lower molded-sheet portion, the result is that the upper and lower molded-sheet portions are engaged firmly against one another and a labyrinthine path is established between the inside of the domes and the outside of the package, which prevents ingress of contaminants that could damage the disc drive (and also prevents escape of fluids, if any). The foregoing considerations are reflected in the choice of the hinge structure shown in FIGS. 9–10. It is considered that any hinge structure would be equivalent for this purpose if it permitted establishment of these equilibria and stretched appropriately to allow clearance of the respective edges of the flange members when swung between open and fully closed positions (i.e., so that the inner lateral portion of the upper flange member can slip past the outer lateral portion of the lower flange member).

Hinge configurations of this general type are known to manufacturers of plastic packages, and they have been used with other types of package than that of the invention, for example, in food containers. See U.S. Pat. No. 5,242,696, disclosing a reclosable polymeric (polyethylene terephthalate) cheese package utilizing a generally similar hinge for the purpose of biasing the package lid toward an open position. However, it is believed that such hinges have not been used in connection with shock resistant packages for disc drives and other information-storage devices, and in particular for manufacturing a package for a disc drive or other information-storage device and one that is stable in both its open and closed positions because each such configuration is in an energy well.

The package of the invention was compared with other packages in regard to shock resistance, using a non-operating Seagate model No. ST31024A disc drive, accelerometer-equipped on appropriate axes. A bare drive dropped 12 inches to a hard surface received shock in excess of 1060 g, while a Seashell™-packaged drive registered less than 140 g for the same 12 inch drop. The bare drive subjected to a 120 degree topple sustained in excess of 1100 g while the Seashell™-packaged drive registered less than 200 g. A 20 kV "zap" test indicated that the Seashell™-packaged drive met current anti-static specifications as well as a drive in an ESD bag did. Other tests indicated that a Seashell™-packaged drive registered less than 200 g for 1.5 foot drops onto a thin ESD mat and 2 foot drops onto cardboard. The Seashell™ package also met test specifications for contamination entry/exit.

It is contemplated that the proximal end of the package will be covered at least in part with a label that will further hold together the upper and lower portions of the package.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. For example, as claimed the upper flange member nests into the lower flange member, but it would be equivalent to turn these structures upside down so that the lower flange member nests into the upper flange member.

It should be appreciated that the scope of this invention is not limited to the detailed description of the invention hereinabove, which is intended merely to be illustrative, but rather comprehends the subject matter defined by the following claims.

As used in the claims, verticality and height are synonymous.

That which is claimed is:

1. A package adapted to enclose an information-storage device and to protect said information-storage device from static of at least 20 kV and from impact of at least 1000 g, said information-storage device having a predetermined height, length, and width, said package molded from resilient, static-dissipative, plastic sheet material, said package comprising an upper molded-sheet portion connected to a lower molded-sheet portion, each said molded-sheet portion having:

a proximal end and a distal end, a right edge and a left edge, a transverse dimension extending parallel to said proximal end and parallel to said distal end, a longitudinal dimension normal to said transverse dimension and extending parallel to said right edge and said left edge, and a height dimension normal to said length dimension and normal to said transverse dimension;

each said molded-sheet portion comprising, as integrally formed portions thereof, molded therefrom:

a flange member occupying peripheral portions of said molded-sheet portion proximate said proximal end, said distal end, said right edge, and said left edge; and a generally concave-inward dome centrally located on said molded-sheet portion, extending vertically outward therefrom, and surrounded by said flange member, said dome comprising:

proximal, distal, right, and left dome walls with base ends and outer ends, said base ends being proximate said flange member, said dome walls vertically extending outward from and normal to said flange member, a plurality of alternating laterally convex-inward and laterally convex-outward resilient buttresses located within at least some of said dome walls, said buttresses extending vertically from said base ends to said outer ends, said laterally convex-inward portions of said buttresses having inward lateral extremities defining within said dome peripheral portions of a centrally located compartment space, said compartment space dimensioned to correspond to the length and the width of the information-storage device, said compartment space adapted for holding the information-storage device therein; and a dome roof, said roof having a proximal end, a distal end, a right edge, and a left edge that are integrally formed with and normal to, respectively, said proximal, distal, right, and left dome walls, said roof having a plurality of convex-outward, resilient ribs formed thereon, said ribs extending outward from and normal to said roof, said ribs extending across at least a major portion of the roof, said ribs being adapted to absorb impact forces of at least 1000 g and protect therefrom an information-storage device stored within said dome;

said dome roof of said upper molded-sheet portion distanced from said dome roof of said lower molded-sheet portion by approximately the height of the information-storage device; said flange member of said upper molded-sheet portion being adapted to fit tightly against said flange member of said lower molded-sheet portion to prevent or hinder ingress to or egress from said domes; and said molded-sheet portions being generally congruent to one another and adapted so to engage one another that the flange member of one molded-sheet portion nests into the flange member of the other molded-sheet portion after the molded-sheet portions are pressed together, whereby a closed package is provided.

2. A package according to claim 1 wherein said distal ends of said molded-sheet portions are hinged together.

3. A package according to claim 2 wherein said molded-sheet portions are integrally formed from a sheet of plastic material to constitute a unitary article.

4. A package according to claim 1 wherein each said flange member includes a region with a non-straight-line vertical cross-section to provide a labyrinthine path adapted to prevent or hinder ingress to and egress from said domes.

5. A package according to claim 1 wherein:
each said flange member of said upper and lower molded-sheet portions comprises
an inner lateral portion integral with and transversely and longitudinally surrounding said dome walls and extending laterally outward therefrom,
an intermediate vertical portion integral with and transversely and longitudinally surrounding said inner lateral portion at outer edges thereof and extending vertically upwards therefrom, and
an outer lateral portion integral with and transversely and longitudinally surrounding said intermediate vertical points at outer edges thereof and extending laterally outward therefrom; and
said flange member of said upper molded-sheet portion is adapted to nest within said flange member of said lower molded-sheet portion when the package is closed.

6. A package according to claim 5 wherein said ribs each have a longitudinal axis that is disposed generally transversely with respect to said molded-sheet portions.

7. A package according to claim 6 wherein said ribs extend fully across the dome roof almost to, but not entirely to, said intermediate vertical portions of said flange members.

8. A package according to claim 7 wherein each said rib, at each outer extremity thereof, makes a right angle turn vertically and continues toward said inner lateral portion as one of said laterally convex-outward buttresses.

9. A package according to claim 6 wherein said plurality of ribs is five.

10. A package according to claim 5 wherein a longitudinally flexing hinge joins said distal ends of said molded-sheet portions and is integrally formed therewith, said hinge having a plurality of folds such that said hinge is adapted for bending and for longitudinally extending or contracting to permit the following:

the upper molded-sheet portion to be rotated from an open configuration of the package to a configuration in which the upper molded-sheet portion is directly over and approximately in registration with the lower sheet portion;

the inner lateral portion of the flange member of the upper molded-sheet portion to slip past the outer lateral portion of the flange member of the lower molded-sheet portion, whereby the package assumes a fully closed configuration; and the package to remain stably in said fully closed configuration; and and to permit the reverse sequence of actions, whereby the package remains stably in an open configuration.

11. A package according to claim 1 wherein:
said ribs are generally transversely disposed on said domes, extend fully across the dome roof, and have transverse extremities extending at least to said right and left vertical dome walls of said domes; and
said outwardly convex buttresses disposed along said right and left dome walls of said domes coincide in location with said transverse extremities of said ribs.

12. A package according to claim 1 wherein said information-storage device is a disc drive.

13. A package according to claim 1 wherein said plastic sheet material is polyvinyl chloride.

14. A method of protecting an information-storage device, said information-storage device having a predetermined height, length, and width, from impact and electrostatic discharge, said method comprising:
(1) providing a protective package;
(2) placing within said protective package an information-storage device that is susceptible to damage from impact and electrostatic discharge; and
(3) closing said protective package around said information-storage device;
said protective package molded from resilient, static-dissipative, plastic sheet material,
said package comprising an upper molded-sheet portion connected to a lower molded-sheet portion, each said molded-sheet portion having
a proximal end and a distal end,
a right edge and a left edge,
a transverse dimension extending parallel to said proximal end and parallel to said distal end,
a longitudinal dimension normal to said transverse dimension and extending parallel to said right edge and said left edge, and
a height dimension normal to said length dimension and normal to said transverse dimension;
each said molded-sheet portion comprising, as integrally formed portions thereof, molded therefrom:
a flange member occupying peripheral portions of said molded-sheet portion proximate said proximal end, said distal end, said right edge, and said left edge; and
a generally concave-inward dome centrally located on said molded-sheet portion, extending vertically outward therefrom, and surrounded by said flange member, said dome comprising:

proximal, distal, right, and left dome walls with base ends and outer ends, said base ends being proximate said flange member, said dome walls vertically extending outward from and normal to said flange member, a plurality of alternating laterally convex-inward and laterally convex-outward resilient buttresses located within at least some of said dome walls, said buttresses extending vertically from said base ends to said outer ends, said laterally convex-inward portions of said buttresses having inward lateral extremities defining within said dome peripheral portions of a centrally located compartment space, said compartment space dimensioned to correspond to the length and the width of the information-storage device, said compartment space adapted for holding the information-storage device therein; and a dome roof, said roof having a proximal end, a distal end, a right edge, and a left edge that are integrally formed with and normal to, respectively, said proximal, distal, right, and left dome walls, said roof having a plurality of convex-outward, resilient ribs formed thereon, said ribs extending outward from and normal to said roof, said ribs being adapted to absorb impact forces and protect therefrom the information-storage device stored within said dome;

said dome roof of said upper molded-sheet portion distanced from said dome roof of said lower molded-sheet portion by approximately the height of the information-storage device; said flange member of said upper molded-sheet portion being adapted to fit tightly against said flange member of said lower flange portion to prevent or hinder ingress to or egress from said domes; and said molded-sheet portions being generally congruent to one another and adapted so to engage one another that the flange member of one molded-sheet portion nests into the flange member of the other molded-sheet portion after the molded-sheet portions are pressed together, whereby a closed package is provided.

15. A method of manufacturing a package for protecting a disc drive from impact and electrostatic discharge, said manufacturing method comprising:

(1) providing a vacuum mold adapted to produce a molded article in accordance with claim 1;

(2) placing a sheet of static-dissipative material into said mold and subjecting said sheet to vacuum molding, whereby a finished molded article is provided;

(3) removing said finished molded article from said mold.

16. A method according to claim 15 wherein said vacuum mold is conventional and said vacuum molding is conventional.

17. A package according to claim 1, wherein:

said molded-sheet portions are integrally formed from a sheet of plastic material to constitute a unitary article and are joined by a hinge;

each said flange member includes end and edge regions having a non-straight-line vertical cross-section to provide a labyrinthine path adapted to prevent or hinder ingress to and egress from said domes;

said plurality of ribs is five;

said ribs each have a longitudinal axis and a generally semicircular cross-section normal to said longitudinal axis; and said ribs occupy about four tenths of said dome roof.

18. A package according to claim 17, wherein:

each of said ribs has a first end and a second end respectively disposed at ends of the longitudinal axis of the rib and located at an outer end of a vertical dome wall of a one of said domes;

said ends of said ribs each coincide in location with a corresponding one of said outwardly disposed buttresses, whereby said rib makes a right-angle turn at said end of the rib and continues as a buttress along the dome wall to the base end of the dome; and said information-storage device is a disc drive.

* * * * *